United States Patent
Yoshida

(10) Patent No.: US 7,974,372 B2
(45) Date of Patent: Jul. 5, 2011

(54) OFDM RECEIVING METHOD AND RECEIVING APPARATUS

(75) Inventor: Makoto Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 849 days.

(21) Appl. No.: 11/233,620

(22) Filed: Sep. 23, 2005

(65) Prior Publication Data

US 2006/0262869 A1    Nov. 23, 2006

(30) Foreign Application Priority Data

May 20, 2005    (JP) ................................. 2005-147759

(51) Int. Cl.
*H03D 1/06* (2006.01)
(52) U.S. Cl. ......... 375/348; 375/260; 375/229; 375/265
(58) Field of Classification Search ................... 375/348
See application file for complete search history.

(56) References Cited

U.S. PATENT DOCUMENTS

| | | | | |
|---|---|---|---|---|
| 6,587,501 | B2* | 7/2003 | Yu ................ | 375/147 |
| 6,937,648 | B2* | 8/2005 | Raphaeli ............ | 375/229 |
| 2003/0118122 | A1* | 6/2003 | Nefedov ............ | 375/265 |
| 2004/0091057 | A1 | 5/2004 | Yoshida | |
| 2004/0247020 | A1* | 12/2004 | Mills et al. ........... | 375/148 |
| 2006/0018413 | A1* | 1/2006 | Gupta ................ | 375/343 |

FOREIGN PATENT DOCUMENTS

| | | |
|---|---|---|
| JP | 2001-186024 | 7/2001 |
| JP | 2003-198513 | 7/2003 |
| JP | 2004-221702 | 8/2004 |
| JP | 2004-289475 | 10/2004 |

OTHER PUBLICATIONS

Notification of Reason for Refusal dated Mar. 8, 2010, from the corresponding Japanese Application.
Takahiro Asai, et al. "Turbo Equalization without Coding" Proceedings of the 2001 Society Conference of the Institute of Electronics, Information and Communication Engineers, vol. 1, Aug. 29, 2001, p. 436.

* cited by examiner

*Primary Examiner* — Shuwang Liu
*Assistant Examiner* — Lihong Yu
(74) *Attorney, Agent, or Firm* — Katten Muchin Rosenman LLP

(57) ABSTRACT

Disclosed is an OFDM receiving apparatus for receiving a signal that has sustained inter-symbol interference owing to a delayed wave that exceeds a guard interval, eliminating at least inter-symbol interference from the receive signal and applying demodulation and decoding processing to the receive signal from which interference has been eliminated. A combination of number of iterations of the equalization processing for eliminating interference from a receive signal and for demodulating and decoding the receive signal and number of iterations for repeating the decoding in the decoding processing is changed over based upon the state of the propagation path, e.g., the SIR, which is the ratio of desired signal power to interference power.

8 Claims, 9 Drawing Sheets

PROPAGATION PATH MODEL

OFDM RECEIVING METHOD AND RECEIVING APPARATUS

BACKGROUND OF THE INVENTION

This invention relates to an OFDM receiving method and apparatus. More particularly, the invention relates to an OFDM receiving method and apparatus for receiving a signal that has sustained inter-symbol interference owing to delayed waves that exceed a guard interval, eliminating at least inter-symbol interference from the receive signal and applying demodulation and decoding processing to the receive signal from which interference has been eliminated.

In wideband wireless communications, frequency-selective fading ascribable to a multipath environment occurs. A useful scheme for dealing with this is multicarrier modulation, which divides the transmission band into a plurality of narrow bands (subcarriers) and transmits them in parallel in such a manner that frequency-selective fading will not occur. At present, specifications relating to digital TV/audio broadcasting (Japan and Europe) and wireless LAN (IEEE 802.11a) are being standardized with the Orthogonal Frequency Division Multiplex (OFDM) transmission scheme, which is one type of multicarrier modulation scheme, as the base. Further, OFDM-based modulation schemes have been proposed even in next-generation mobile communication systems.

In OFDM transmissions, a guard interval GI is inserted in order to eliminate inter-symbol interference (ISI) ascribable to multipath. FIG. 8 is a diagram useful in describing insertion of a guard interval. If M subcarrier samples (=1 OFDM symbol) are taken as one unit, then GI insertion signifies copying the tail-end portion of this symbol to the leading-end portion thereof. Inserting a guard interval GI makes it possible to eliminate the effects of inter-symbol interference ascribable to multipath.

FIG. 9 is a diagram useful in describing inter-symbol interference due to delayed waves, where A represents a direct wave and B a delayed wave (reflected wave). If delay time $\tau$ of delayed wave B is less than a guard-interval length $N_G$, as indicated at (a) in FIG. 9, then a data symbol $D_0$ of direct wave A will not overlap other data symbols of delayed wave B in a window timing W and inter-symbol interference will not occur. However, if delay time $\tau$ of delayed wave B is greater than the guard-interval length $N_G$, as indicated at (b) in FIG. 9, data symbol $D_0$ of direct wave A will overlap another data symbol $D_{-1}$ of delayed wave B in the window timing W and inter-symbol interference will occur. Accordingly, maximum delay time $\tau_{max}$ of the delayed wave is taken into account and the guard-interval length $N_G$ is decided in such a manner that ISI will not occur.

In view of the foregoing, even if multipath delayed waves within the length of a GI symbol exist in an OFDM transmission, ISI will not occur owing to insertion of the GI. An advantage of this is that decoding can be performed without using equalization (i.e., the transmission is resistant to multipath fading). On the other hand, the adding on of a GI symbol (redundant symbol) causes a decline in transmission efficiency; the greater the GI symbol length, the more transmission efficiency declines. Accordingly, the present applicant has proposed a method whereby ISI and inter-carrier interference (ICI) can be reduced even when the GI symbol length is not made greater than the maximum delay time $\tau_{max}$ of the delayed wave (see Japanese Patent Application Laid-Open Nos. 2004-208254 and 2004-289475).

FIG. 10 is a diagram useful in describing ISI elimination. A delayed wave B lags behind a direct wave A by the GI length $N_G$ or more, and the delay time $N\tau_{max}$ satisfies the relation $N_G<N\tau_{max}$. The data symbol $D_0$ of the direct wave A partially overlaps a pilot symbol P of the delayed wave B and sustains ISI from the pilot symbol P of the delayed wave B. It is necessary, therefore, to remove this portion [see the hatched portion at (d) of FIG. 10] of the pilot symbol from the receive signal. The time over which interference is received (the number of samples) is $y=(N\tau_{max}-N_G)$. Accordingly, the y portion is cut out of the already known pilot-signal waveform and is generated as an ISI replica $RP_P$ [see the hatched portion at (e) of FIG. 10]. The ISI replica $RP_P$ is subtracted from the receive signal [see the left side at (f) of FIG. 10]. As a result, the portion of the delayed wave that interferes with the direct wave can be made zero and it is possible to eliminate ISI interference. That is, by applying FFT processing to the signal at (f) of FIG. 10, OFDM demodulation that will not be affected by ISI becomes possible.

In a manner similar to that set forth above, a data symbol $D_1$ (see FIG. 10) of the direct wave A partially overlaps the preceding data symbol $D_0$ of the delayed wave B and sustains ISI interference from the data symbol $D_0$ of delayed wave B. It is necessary, therefore, to remove this portion of the data symbol $D_0$ from the receive signal. The time over which ISI interference is received (the number of samples) is y. Accordingly, the y portion is cut out of the time waveform of the preceding data symbol $D_0$ and is generated as an ISI replica $RP_0$ [see the hatched portion at (e) of FIG. 10]. The ISI replica $RP_0$ is subtracted from the receive signal [see the right side at (f) of FIG. 10]. As a result, the portion of the delayed wave that interferes with the direct wave can be made zero and it is possible to eliminate ISI interference. That is, by applying FFT processing to the signal at (f) of FIG. 10, OFDM demodulation that will not be affected by ISI becomes possible.

FIG. 11 is a diagram useful in describing elimination of ICI. By virtue of the ISI elimination processing described above, the portion of the ISI segment y of the delayed wave B shown at (a) of FIG. 11 is eliminated, thereby generating the receive signal indicated at (b), and this signal is subjected to FFT processing to eliminate inter-symbol interference ISI. However, the delayed wave B becomes discontinuous at the portion of the ISI segment y. Moreover, the waveform is no longer periodic. Consequently, each subcarrier component obtained by FFT processing includes distortion ascribable to inter-carrier interference ICI. In order to eliminate such inter-carrier interference ICI, it is necessary to insert a waveform so as to smoothen the ISI segment y of the delayed waveform B and make the delayed waveform periodic, as indicated by the dashed line at (c) of FIG. 11.

Accordingly, the receive signal at (b) of FIG. 11 is subjected to FFT processing, as shown at (d) of FIG. 11, after which IFFT processing is applied, thereby providing a continuous signal waveform, as shown at (e) of FIG. 11. If the tail-end segment y of the continuous signal waveform at (e) of FIG. 11 is cut out and inserted into the segment y at the front end of the receive signal at (b) of FIG. 11, the delayed wave B will become a continuous periodic waveform, as shown at (f) of FIG. 11. If FFT processing is applied to the signal at (f) of FIG. 11, ICI is suppressed. It should be noted that, ideally, it is necessary for the delayed wave B shown at (f) of FIG. 11 to be made a continuous periodic waveform by the waveform at (e) of FIG. 11. However, since the waveform at (b) of FIG. 11 is subjected to FTT and IFFT processing, the waveform at (e) of FIG. 11 departs slightly from the ideal shape.

FIG. 12 is a block diagram of an OFDM receiver for applying OFDM demodulation processing to a signal that has undergone ISI and ICI removal, subjecting the demodulated signal obtained to decoding processing and outputting the decoded signal.

A GI removing unit 100 removes the GI from the receive signal, and a pilot/data separating unit 101 separates data and a pilot from the receive signal, inputs the data to an ISI replica generating/eliminating unit 102 and inputs the pilot to a delay profile generator 103. The delay profile generator 103 calculates the correlation between the receive pilot signal and the already known pilot signal and outputs a delay profile.

An ISI replica generator 102a adopts, from the delay profile, a delay-time portion greater than the guard-interval-length NG as an ISI portion and generates, as an ISI replica, a time-waveform portion of the already known symbol (pilot symbol), which conforms to the ISI portion, or a time-waveform portion of the preceding symbol [see (e) of FIG. 10]. A channel compensator 102b multiplies the ISI replica by a channel estimation value, thereby applying channel compensation, and inputs the result to a subtractor 102c. The latter subtracts the ISI replica from the receive signal and inputs the direct wave A and delayed wave B (data symbol $D_0$), which are shown on the left side at (f) of FIG. 10, to an FFT processor 104, which is the next stage.

The FFT processor 104 applies FFT processing to the receive signal input thereto, thereby generating data elements on a per-subcarrier basis. An FFT processor 105 applies FFT processing to the channel estimation value, thereby generating a channel compensation value for each subcarrier. A channel compensator 106 multiplies the result of FFT processing by a channel compensation value subcarrier by subcarrier, demodulates data elements of the number of subcarriers that constitute the data symbol $D_0$ and inputs the result to a replica generating/ICI eliminating unit 107.

The replica generating/ICI eliminating unit 107 has an IFFT processor 107a which applies IFFT processing to the demodulated data of the number of subcarriers constituting the data symbol $D_0$ output from the channel compensator 106 and outputs the time-waveform signal [see (e) of FIG. 11] of data symbol $D_0$. A demodulated-signal restoration replica generator 107b cuts out the signal portion of the y segment [see (e) of FIG. 11] at the tail end of the time-waveform signal that enters from the IFFT processor 107a, thereby generating a demodulated-signal restoration replica (ICI replica), and inputs the replica to a combiner 107c. The latter adds the demodulated-signal restoration replica to the receive signal [see (d) of FIG. 11] that is output from the subtractor 102c, thereby producing a continuous signal waveform, and inputs this waveform to an FFT processor 108a of an OFDM demodulator 108.

The FFT arithmetic unit 108a applies FFT processing to the combined signal that is output from the combiner 107c, thereby generating data elements on a per-subcarrier basis. A channel compensator 108b multiplies the result of FFT processing by the channel compensation value subcarrier-by-subcarrier and outputs the result of channel estimation as a decoded signal. As a result of the operation described above, inter-carrier interference ICI can be suppressed together with inter-symbol interference ISI.

A decoding processor 109 applies error-correcting decoding processing to OFDM-demodulated data (soft-decision data) and outputs the decoded result (hard-decision data). Examples of an error-correcting code that can be used are a turbo code, which is capable of implementing an error characteristic near the Shannon limit, and a low-density parity check (LDPC: Low Density Parity Check) code. A method of improving the error characteristic by updating a priori probability of each receive bit stream of a code word, which has been obtained prior to decoding processing, to a value having a high probability through iterative decoding is used as the decoding method in these error-correcting codes.

An error-correcting encoder 110 encodes the result of decoding processing, and an IFFT processor 111 applies IFFT processing to the decoded data of the number of subcarriers that constitute the encoded data symbol $D_0$ and outputs the time-waveform signal of the data symbol $D_0$. A delay circuit 112 delays this time-waveform signal by a time equivalent to one symbol time $T_S$ and inputs the delayed signal to the ISI replica generator 102a.

In a manner similar to that described above, a data symbol $D_1$ (see FIG. 10) of the direct wave A partially overlaps the preceding data symbol $D_0$ of the delayed wave B and sustains ISI from the data symbol $D_0$ of the delayed wave B. It is necessary, therefore, to remove this portion of the data symbol $D_0$ from the receive signal. The time (number of samples) subjected to ISI is y. Accordingly, the ISI replica generator 102a cuts the y portion out of the time-waveform signal (the output signal of the delay circuit 112) of the previous data symbol $D_0$ to generate it as the ISI replica [see the hatched portion at (e) of FIG. 10]. The channel compensator 102b multiplies the ISI replica by the channel estimation value, thereby applying channel compensation, and inputs the result to the subtractor 102c. The latter subtracts the ISI replica from the receive signal and inputs the direct wave A and delayed wave B (data symbol $D_1$), which are shown on the right side at (f) of FIG. 10, to the FFT processor 104, which is the next stage. Thenceforth, and in similar fashion, processing is executed in a manner similar to that of data symbol $D_0$.

In accordance with the OFDM receiver described above, the BER (Bit Error Rate) characteristic can be improved by eliminating ISI and ICI. Further, by repeating a series of processes (referred to as "turbo equalization processing"), namely replica generation, ISI and ICI removal, demodulation and decoding, an excellent transmission characteristic can be implemented even in a multipath environment in which the GI length is exceeded. In addition, if code is a turbo code and LDPC code, the greater the number of decoding iterations, the more the error characteristic can be improved.

Thus, the greater the number $\alpha$ of turbo equalization iterations and number $\beta$ of decoding iterations, the better the reception characteristic. A problem, however, is that the greater the numbers $\alpha$, $\beta$ of iterations, the longer the processing time required. In application to an actual system, therefore, it is necessary to limit the number of turbo equalization iterations and number of decoding iterations in such a manner that receive processing will be completed within a stipulated period of time.

Several combinations of numbers of turbo equalization iterations and numbers of decoding iterations for completing receive processing within the stipulated time are conceivable. Which combination will give the best reception characteristic differs depending upon the propagation path. In a mobile communication environment, the propagation path changes with time. Consequently, in a case where receive processing has been executed with a combination of predetermined numbers of turbo equalization iterations and decoding iterations, a problem which arises is that the optimum reception characteristic cannot always be obtained.

Further, in a case where the combination of number of turbo equalization iterations and number of decoding iterations is changed, a function and criteria for estimating the propagation path and deciding the combination of number of turbo equalization iterations and number of decoding iterations using the estimated propagation path are necessary.

SUMMARY OF THE INVENTION

Accordingly, an object of the present invention is to perform decoding processing using a combination, which will provide the optimum reception characteristic, among combinations of numbers of turbo equalization iterations and numbers of decoding iterations for which receive processing will be completed within a stipulated period of time.

Another object of the present invention is to perform decoding processing upon changing over to a combination that will give the optimum reception characteristics in accordance with a change in the propagation path.

In accordance with the present invention, the foregoing objects are attained by providing an OFDM receiving method and apparatus for receiving a signal that has sustained inter-symbol interference owing to a delayed wave that exceeds a guard interval. a step of eliminating at least inter-symbol interference from the receive signal, a step of applying demodulation and decoding processing to the receive signal from which interference has been eliminated, and step of changing over the OFDM receiving method of the present invention comprises a step of eliminating at least inter-symbol interference from the receive signal, a step of applying demodulation and decoding processing to the receive signal from which interference has been eliminated, and step of changing over a combination of number of iterations of equalization processing for eliminating interference from the receive signal and for demodulating and decoding the receive signal and number of iterations for repeating the decoding in the decoding processing, based upon the state of the propagation path. In said method, SIR, which is the ratio of the desired signal power to interference power is utilized as said state of the propagation path. More specifically, a corresponding relationship between combinations of numbers of iterations of the equalization processing and numbers of iterations of the decoding and SIRs is set in advance, and the number of iterations of the equalization processing and number of iterations of the decoding are decided using this corresponding relationship.

Further, in said method taking into consideration the time required for processing in the equalization processing other than the decoding processing and the time required to perform the decoding one time, a combination of number of iterations of the equalization processing and number of iterations of the decoding is obtained in such a manner that the equalization processing of the number of iterations will be completed within a set processing time, and the corresponding relationship between each combination and SIR is set so as to optimize the reception characteristic.

An OFDM receiving apparatus according to the present invention comprises an interference eliminating unit for eliminating at least inter-symbol interference from a receive signal; a demodulation processing unit for applying demodulation processing to the receive signal from which interference has been eliminated; a decoding processing unit for applying error-correcting decoding processing to the demodulated signal; and an iteration controller for deciding, based upon state of a propagation path, a combination of number of iterations of equalization processing for eliminating interference from the receive signal and for demodulating and decoding the receive signal, and number of iterations for repeating the decoding in the decoding processing. A SIR estimation unit estimates SIR, which is the ratio of the desired signal to interference power, as state of the propagation path using an impulse response group of the propagation path with respect to an OFDM symbol group.

In accordance with the present invention, it is so arranged that a combination of number of iterations of equalization processing and number of iterations of decoding processing is changed over based upon the state of the propagation path, e.g., the SIR, which is the ratio of the desired signal power to interference power. As a result, decoding processing can be executed upon changing over to the combination that affords the optimum reception characteristic in accordance with the state of the propagation path.

Further, according to the present invention, taking into consideration the time required for processing in the equalization processing other than decoding processing and the time required for a single decoding, a combination of number of iterations of equalization processing and number of iterations of decoding is obtained in such a manner that equalization processing of the number of iterations will be completed within a set processing time, and the corresponding relationship between each combination and SIR is set so as to optimize the reception characteristic. As a result, the optimum decoding processing can be executed using a combination of number of iterations of equalization and number of iterations of decoding such that receive processing will be completed within a stipulated period of time.

Other features and advantages of the present invention will be apparent from the following description taken in conjunction with the accompanying drawings.

DESCRIPTION OF THE PREFERRED EMBODIMENTS

In an OFDM receiving method for receiving a signal that has sustained inter-symbol interference owing to a delayed wave that exceeds a guard interval, eliminating at least intersymbol interference from the receive signal and applying demodulation and decoding processing to the receive signal from which interference has been eliminated, a combination of number of iterations of equalization processing for eliminating interference from the receive signal and demodulating and decoding the receive signal and number of iterations for repeating the decoding in the decoding processing is changed over based upon the state of the propagation path, e.g., the SIR, which is the ratio of the desired signal power to interference power. That is, a corresponding relationship between combinations of numbers of iterations of the equalization processing and numbers of iterations of the decoding and the SIRs are set in advance, and the number of iterations of the equalization processing and number of iterations of the decoding are decided using this corresponding relationship.

(A) STRUCTURE OF OFDM RECEIVING APPARATUS

Figure 1:
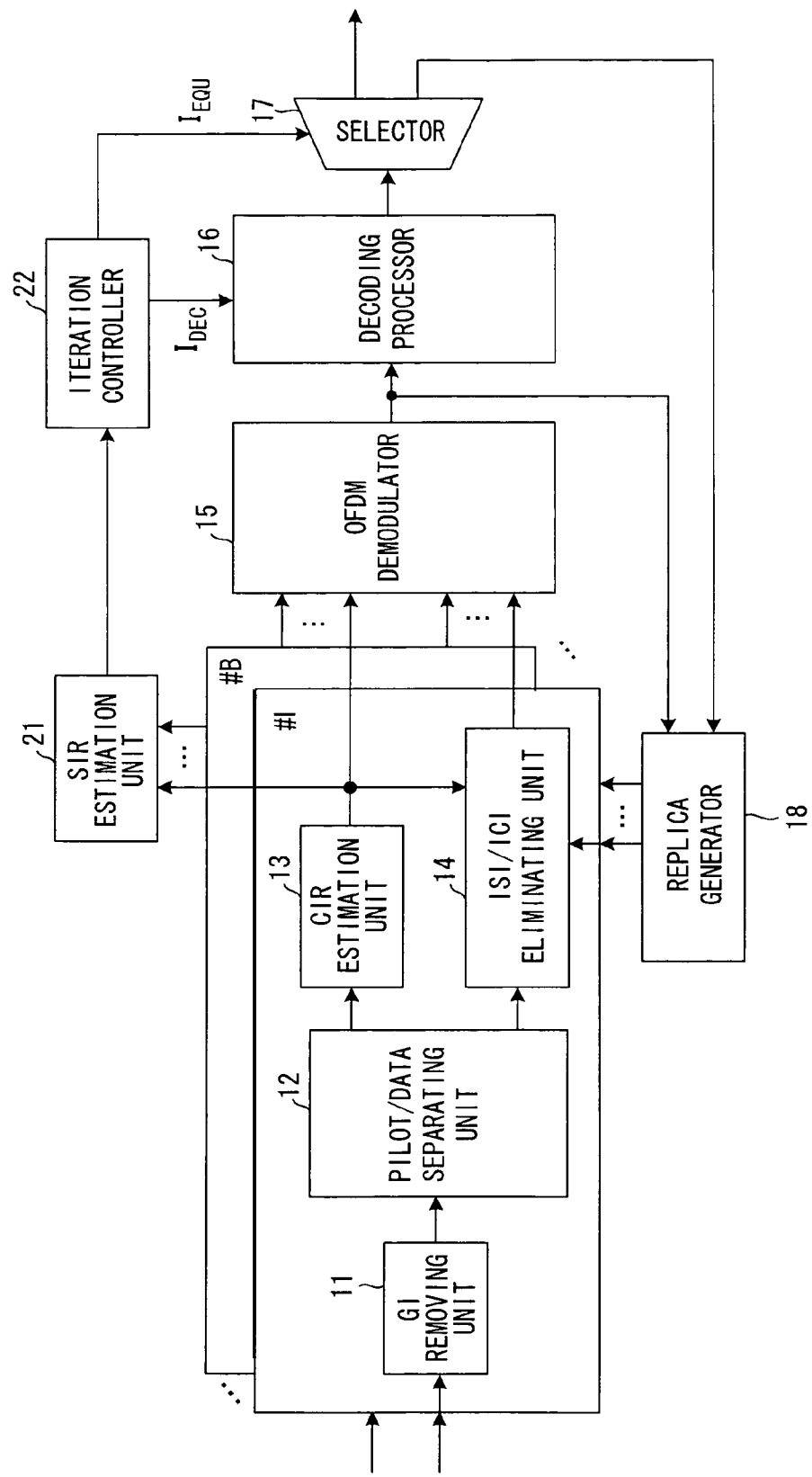
FIG. 1 is a block diagram illustrating an OFDM receiving apparatus according to the present invention.

FIG. 1 is a block diagram illustrating the structure of the OFDM receiving apparatus according to the present invention. This is a diversity arrangement, in which receive branches #1 to #B are provided for every receive antenna (not shown). It should be noted, however, that a diversity arrangement need not necessarily be adopted.

Each branch has a GI removing unit 11 for removing the guard interval from the antenna receive signal; a pilot/data separating unit 12 for separating data and a pilot from the signal from which the guard interval has been removed; a channel impulse response estimation unit (CIR estimation unit) 13 for estimating the channel by calculating the correlation between the receive pilot and already known pilot; and an ISI/ICI eliminating unit 14 for eliminating ICI, ISI replicas from the receive signal. An OFDM demodulator 15 combines the output signals (the signals from which ISI and ICI have been eliminated) from respective ones of the branches by maximum-ratio combining or some other method, applies demodulation processing to the combined signal and outputs the demodulated signal.

A decoding processor 16 executes a specified number ($=I_{DEC}$) of iterations of decoding processing and outputs the result of decoding. If turbo equalization processing of a specified number ($=I_{EQU}$) of iterations of equalization has not been completed, a selector 17 inputs the result of decoding to a replica generator 18 which, based upon the result of decoding, generates an ISI replica and a demodulated-signal restoration replica and inputs these to the ISI/ICI eliminating unit 14 of each of the branches #1 to #B so that the above-described processing is repeated. Further, if turbo equalization processing of the specified number of iterations of equalization has been completed, the selector 17 outputs the result of decoding. Here turbo equalization processing is a series of processes comprising replica generation, ISI and ICI removal, demodulation and decoding.

A SIR estimation unit 21 estimates, for every encoded block, the SIR based upon the CIR estimation value, receive signal power and interference signal power, and an iteration controller 22 decides the equalization iteration count $I_{EQU}$ and decoding iteration count $I_{DEC}$ based upon the SIR and sets $I_{EQU}$ and $I_{DEC}$ in the selector 17 and decoding processor 16, respectively.

Figure 12:
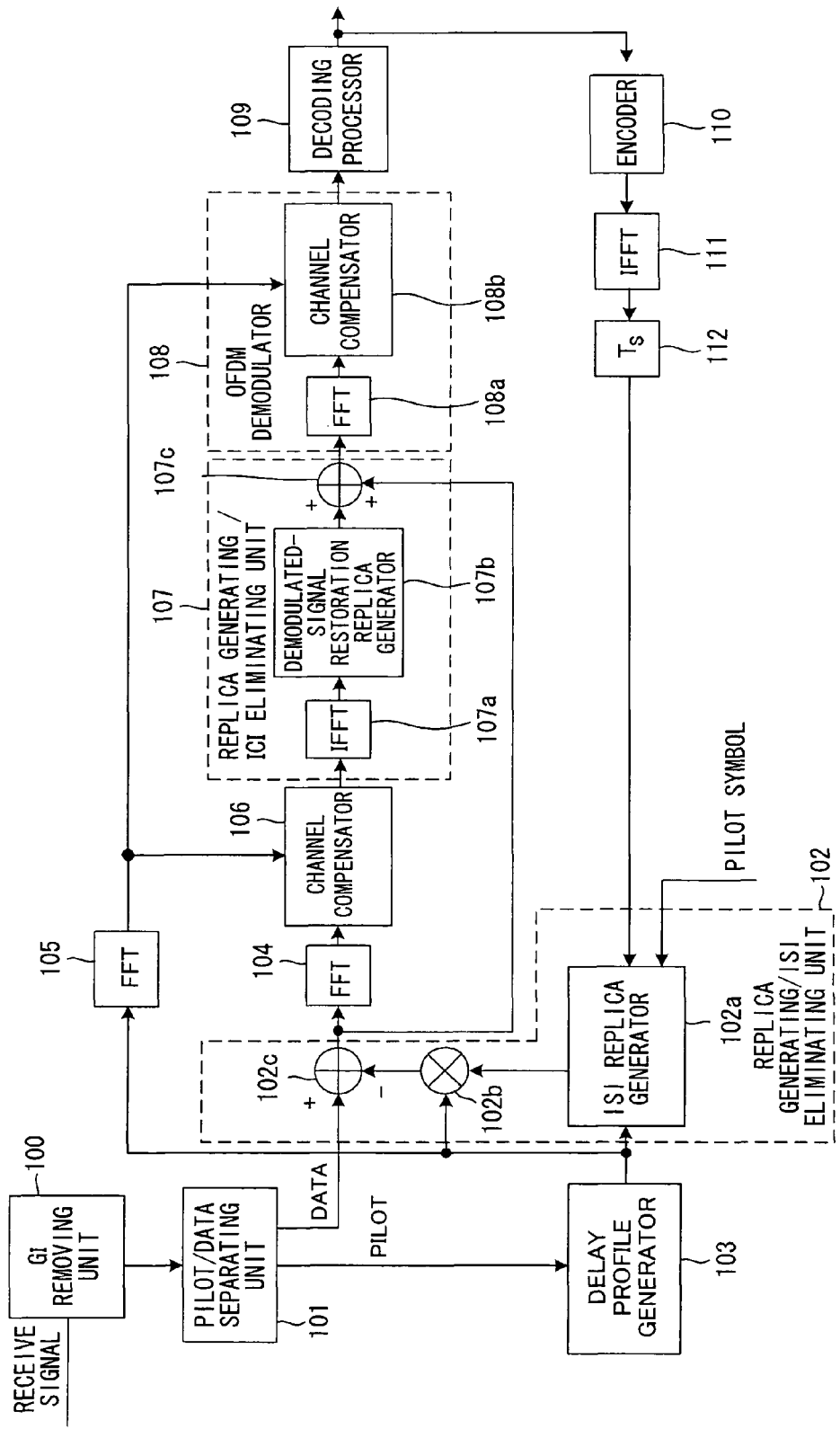
FIG. 12 is a block diagram of an OFDM receiver for applying OFDM demodulation processing to a signal from which ISI and ICI have been eliminated, applying decoding processing to the demodulated signal obtained and outputting the decoded signal.

It should be noted that the GI removing unit 11, pilot/data separating unit 12 and CIR estimation unit 13 correspond to the GI removing unit 100, pilot/data separating unit 101 and delay profile generator 103, respectively, in FIG. 12. Further, the ISI/ICI eliminating unit 14 corresponds to the subtractor 102c that eliminates ISI and the combiner 107c that eliminates ICI in FIG. 12, the OFDM demodulator 15 and decoding processor 16 correspond to the OFDM modulator 108 and decoding processor 109, respectively, and the replica generator 18 corresponds to the replica generator 102a and demodulated-signal restoration replica generator 107b.

(B) DESCRIPTION OF OPERATION USING MATHEMATICAL EXPRESSIONS

The operation of the apparatus shown in FIG. 1 will be described using mathematical expressions. In an OFDM transmission scheme, the transmitting side usually multiplexes the pilot signal and inserts the guard intervals before transmission. On the receiving side, the GI removing unit 11 removes the guard intervals and then the pilot/data separating unit 12 separates the pilot signal [$y_{P,i,b}(k)$] and data signal [$y_{D,i,b}(k)$], where i represents the symbol number, b the receive branch number and k the sample point. Next, the CIR estimation unit 13 derives a CIR estimation value [$\hat{g}_{i,b}(j)$] at a jth sample point in an ith data symbol using the pilot signal $y_{P,i,b}(k)$. The ISI/ICI eliminating unit 14 executes the operations indicated by the following equations:

$$\tilde{y}_{D,i,b}(k) = y_{D,i,b}(k) - \sum_{j \in k < j - N_G} \hat{g}_{i,b}(j) Rep_{i-1}(N - j + N_G + k) \quad (1)$$

$$\hat{y}_{D,i,b}(k) = \tilde{y}_{D,i,b}(k) + \sum_{j \in k < j - N_G} \hat{g}_{i,b}(j) Rep_i(N - j + k) \quad (2)$$

Equation (1) is the signal after elimination of the ISI replica (after ISI elimination), and Equation (2) is the signal obtained after the demodulated-signal restoration replica is added on (i.e., after ICI elimination), where N represents the number of FFT points, NG the length of the guard interval, and $Rep_{i-1}(k)$, $Rep_i(k)$ the replica signals of the preceding symbol and current symbol derived by the replica generator 18. The replica generator 18 initially generates a replica using the data prevailing after OFDM demodulation. At the time of equalization, the replica generator 18 generates a replica using the data that prevails after decoding.

Figure 2:
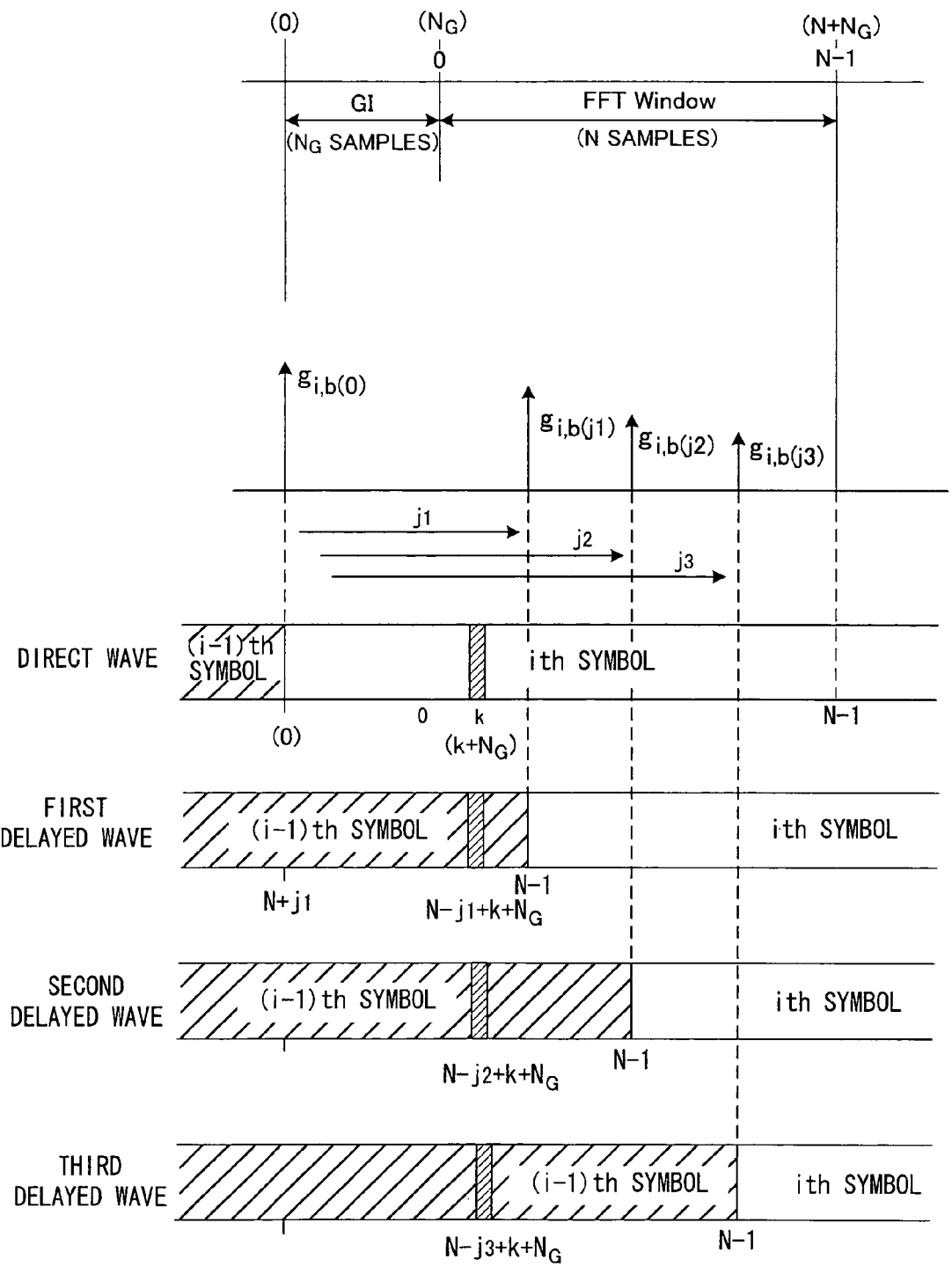
FIG. 2 is a diagram useful in describing a method of deriving an equation representing a signal after elimination of an ISI replica (after ISI elimination)

If reference is had to FIG. 2, Equation (1) can be obtained as set forth below. It should be noted that one OFDM symbol is composed of a guard interval GI of $N_G$ samples and a data portion (FFT window portion) of N samples, a position from the leading end of one OFDM symbol is expressed by 0 to N+$N_G$ enclosed by parentheses [i.e., by (0) to (N+$N_G$)], and a position within the FFT window is expressed by 0 to N−1 not enclosed by parentheses.

If the CIR estimation values of each of the paths of multipath are $g_{i,b}(0)$, $g_{i,b}(j_1)$, $g_{i,b}(j_2)$, $g_{i,b}(j_3)$ and numbers of delay samples, relative to the direct wave, of first to third delayed waves are $j_1$, $J_2$, $j_3$, then the phase relationship between the direct wave and each of the first to third delayed waves will be as illustrated. A receive signal $y_{D,i,b}(k)$ at the time of a kth sample of an ith symbol of the direct wave is the total of the signals indicated by the hatching in FIG. 2. Accordingly, the following holds:

$$y_{D,i,b}(k) = \tilde{y}_{D,i,b}(k) + \sum_{j \in k < j - N_G} \hat{g}_{i,b}(j) Rep_{i-1}(N - j + N_G + k)$$

and Equation (1) is obtained. Equation (2) is obtained by adding the demodulated-signal restoration replica to the left side of Equation (1) from which ISI has been eliminated.

With reference again to FIG. 1, the demodulator 15 combines the output signals (the signals from which ISI and ICI have been eliminated) from respective ones of the branches by maximum-ratio combining or some other method, applies FFT processing to the combined signal, thereby generating data elements on a per-subcarrier basis, and thenceforth multiplies the result of FFT processing by a channel compensation value on a per-subcarrier basis and outputs the result of channel compensation as the demodulated signal.

The SIR estimation unit 21 estimates the SIR for every encoded block (transport block), which is the unit of encoding. A SIR estimation value [$R_{SIR}(q)$] in an OFDM symbol that transmits a qth encoded block is derived employing the following equations using the CIR estimation value $\hat{g}_{i,b}(j)$ obtained from the CIR estimation unit 13:

$$R_{SIR}(q) = \frac{\sum_{b=0}^{B-1}\sum_{i\in C(q)}\sum_{j=0}^{N-1} X_{i,b}(j)|\hat{g}_{i,b}(j)|^2}{\sum_{b=0}^{B-1}\sum_{i\in C(q)}\sum_{j=N_G+1}^{N-1} Y_{i,b}(j)|\hat{g}_{i,b}(j)|^2} \quad (3)$$

$$X_{i,b}(j) = \begin{cases} 1 & j \leq N_G \\ \dfrac{N-j+N_G}{N} & j > N_G \end{cases} \quad (4)$$

$$Y_{i,b}(j) = \frac{(j-N_G)^2}{N^2} + \frac{2(j-N_G)(N-j+N_G)}{N^2} \quad (5)$$

where C(q) represents a set of OFDM symbols that transmit a qth encoded block (where it is assumed that an encoded block is composed of A-number of OFDM symbols, $X_{i,b}(i)$ represents the desired signal power and $Y_{i,b}(i)$ the interference signal power. Furthermore, the methods of deriving Equations (3) to (5) are indicated in an APPENDIX, which is set forth later.

Based upon the SIR estimation value, the iteration controller 22 decides the turbo equalization iteration count $I_{EQU}$ and decoding iteration count $I_{DEC}$, sets the decoding iteration count $I_{DEC}$ in the decoding processor 16, sets the turbo equalization iteration count $I_{EQU}$ in the selector 17 and executes control so as to execute turbo equalization and decoding processing the set numbers of times.

(C) METHOD OF DECIDING TURBO EQUALIZATION ITERATION COUNT $I_{EQU}$ AND DECODING ITERATION COUNT $I_{DEC}$

The turbo equalization iteration count $I_{EQU}$ and decoding iteration count $I_{DEC}$ are decided as set forth below.

If we let $T_{LIMIT}$ represent the time required for receive processing in an actual system, the following equation must be satisfied in order for receive processing to be completed within this processing time:

$$A(I_{EQU}+1)T_{EQU}+(I_{EQU}+1)I_{DEC}T_{DEC} \leq T_{LIMIT} \quad (6)$$

where $T_{EQU}$ represents the time required for replica generation, ISI/ICI elimination and OFDM demodulation processing, $T_{DEC}$ the time required to execute decoding processing one time, and A the number of OFDM symbols necessary to transmit one encoding block. Equalization processing is a series of processes comprising replica generation, ISI and ICI removal, demodulation and decoding processing executed $I_{DEC}$ times. Among these processes, the time required for replica generation, ISI, ICI removal and demodulation is $T_{EQU}$, and the time required for decoding processing one time is $T_{DEC}$. Accordingly, the time required to execute equalization processing one time is $$AT_{EQU}+I_{DEC}T_{DEC} \quad (7)$$

and therefore the processing time needed to execute equalization processing ($I_{EQU}+1$) times is the left side of Equation (6).

Combinations that satisfy Equation (6) are expressed as follows:

$$(I_{EQU}(m), I_{DEC}(m)), m=1, 2, \ldots, M, \quad (8)$$

where M represents the number of combinations that satisfy Equation (6) and satisfies the following equation:

$$I_{EQU}(m) > I_{EQU}(m+1) \quad m=1, 2, \ldots, M-1 \quad (9)$$

Based upon the derived SIR value $R_{SIR}(q)$ from the SIR estimation unit 21, the iteration controller 22 decides the turbo equalization iteration count $I_{EQU}$ and decoding iteration count $I_{DEC}$ from among the combinations that satisfy Equation (6), sets these in the decoding processor 16 and selector 17, respectively, and exercises control (AIC: Adaptive Iteration Control) in such a manner that processing is executed in the number of iterations.

More specifically, (M−1)-number of SIR threshold values $R_{TH}(m)$ are provided and the turbo equalization iteration count $I_{EQU}$ and decoding iteration count $I_{DEC}$ are decided using the following equation:

$$(I_{EQU}, I_{DEC}) = \begin{cases} (I_{EQU}(1), I_{DEC}(1)) & R_{SIR} < R_{TH}(1) \\ (I_{EQU}(m), I_{DEC}(m)) & R_{TH}(m-1) \leq R_{SIR} < R_{TH}(m) \\ (I_{EQU}(M), I_{DEC}(M)) & R_{SIR} \geq R_{TH}(M) \end{cases} \quad (10)$$

Here it is assumed that $R_{TH}(m) < R_{TH}(m+1)$ holds. That is, the smaller the value of SIR, the larger the number of iterations of turbo equalization in the combination.

Figure 3:
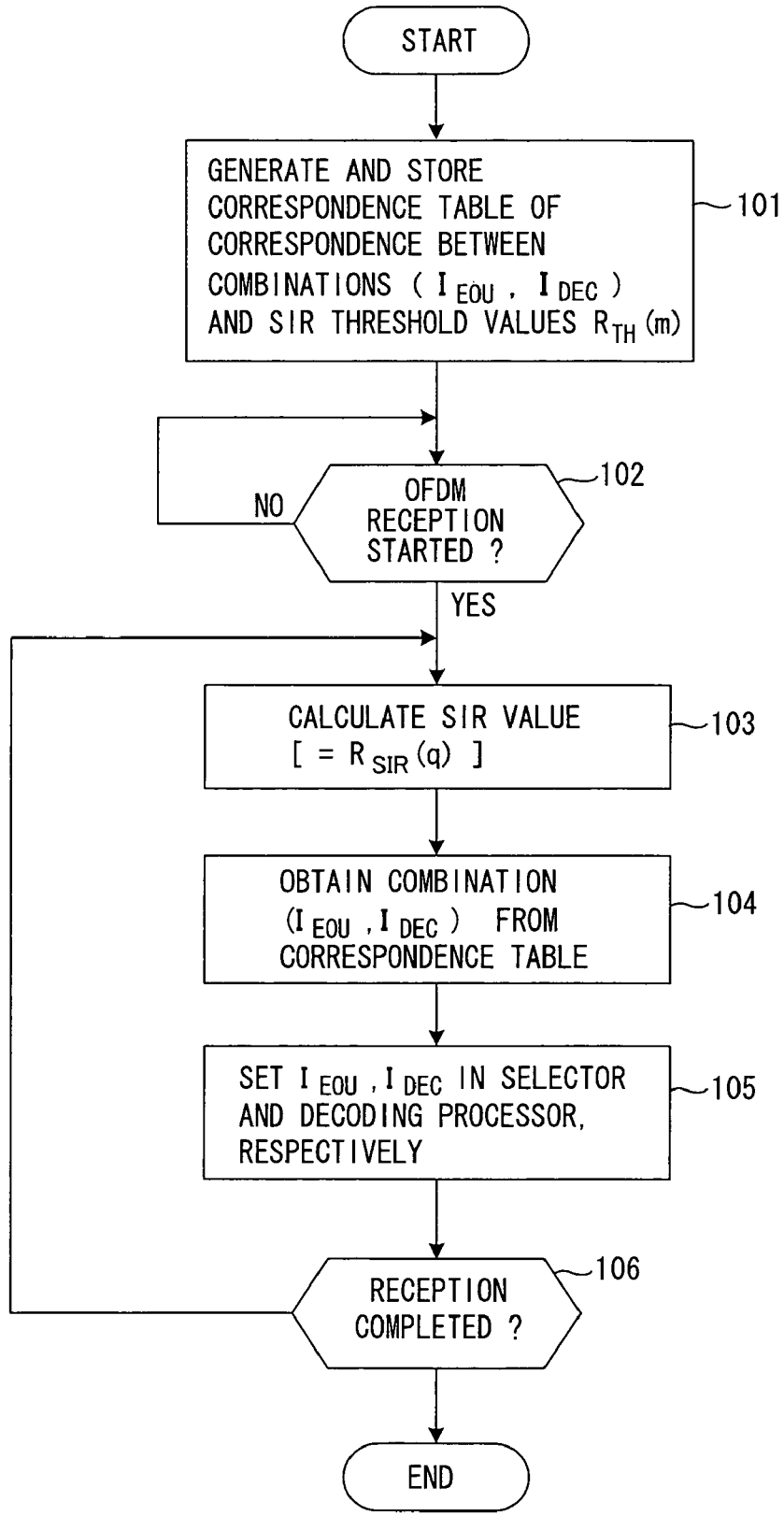
FIG. 3 is a flowchart of processing for deciding a turbo equalization iteration count $I_{EQU}$ and a decoding iteration count $I_{DEC}$.

FIG. 3 illustrates the flow of processing for deciding the turbo equalization iteration count $I_{EQU}$ and decoding iteration count $I_{DEC}$.

A correspondence table [the relation indicated by Equation (10)] indicating the correspondence between combinations ($I_{EQU}$, $I_{DEC}$) of turbo equalization iteration count $I_{EQU}$ and decoding iteration count $I_{DEC}$, which will provide an excellent BLER (Block Error Rate) characteristic, and SIR threshold values $R_{TH}(m)$ is created and stored in advance (step 101).

At the time of OFDM reception (step 102), the SIR value [$=R_{SIR}(q)$] is calculated based upon Equation (3) for every encoded block (step 103), a combination ($I_{EQU}$, $I_{DEC}$) that corresponds to this SIR value is found from the table (step 104), the turbo equalization iteration count $I_{EQU}$ and decoding iteration count $I_{DEC}$ of this combination are set in the selector 17 and decoding processor 16, respectively (step 105), and thenceforth processing from step 103 onward is executed until OFDM reception is completed (step 106).

(D) SIMULATION

Figure 4:
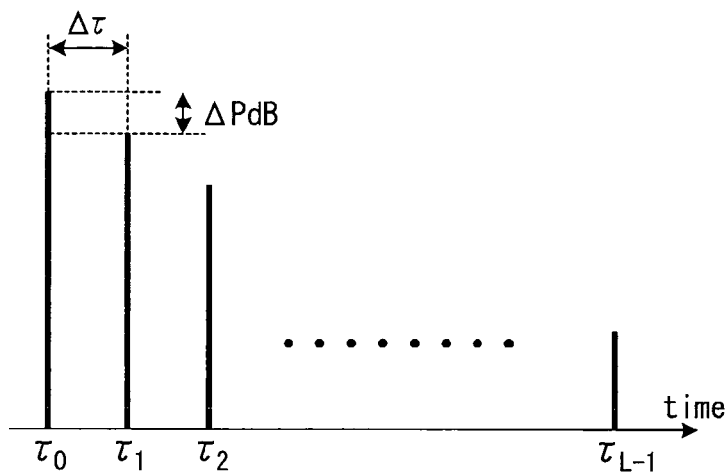
FIG. 4 is a diagram useful in describing a model of a propagation path.

The effects of this embodiment of the present invention will be checked by a simulation. Table 1 below shows simulation parameters, and a propagation path model is illustrated in FIG. 4.

Here it is assumed that $T_{LIMIT}=8T$, $T_{EQU}=0.5$ T, $T_{DEC}=0.045T$, A=2 hold, and the SIR threshold values are $$R_{TH}(1)=6.0, R_{TH}(2)=8.0, R_{TH}(1)=25.0$$

The combinations of turbo equalization iteration count $I_{EQU}$ and decoding iteration count $I_{DEC}$ are three in number, namely (4,13), (3,22) and (1,66).

TABLE 1

SIMULATION PARAMETERS

| | |
|---|---|
| CARRIER FREQUENCY | 5 GHz |
| SAMPLING FREQUENCY | 73.44 MHz |
| NUMBER OF SUBCARRIERS USED | Nc = 896 (N = 1024) |
| SYMBOL INTERVAL | T = 16.67 μs |
| LENGTH OF GI | $N_G$ = 200 |
| FRAME LENGTH | 28 Data + 2 Pilot (=0.5 ms) |
| INFORMATION TRANSMISSION SPEED | 100.2 Mbps |
| MODULATION SCHEME | 16 QAM |
| ERROR-CORRECTING CODE/ DEMODULATION SCHEME | Regular (3, 6) LDPC coding (R = 1/2)/ Normalized BP decoding with α = 1.25 |
| PROPAGATION-PATH ESTIMATION SCHEME | DIME with $1^{st}$-order interpolation in time direction |
| NUMBER OF RECEIVE BRANCHES | B = 2 |
| PROPAGATION-PATH MODEL | 12-wave exponential attenuation model (Δτ = 0.858 μs) |

Figure 5:
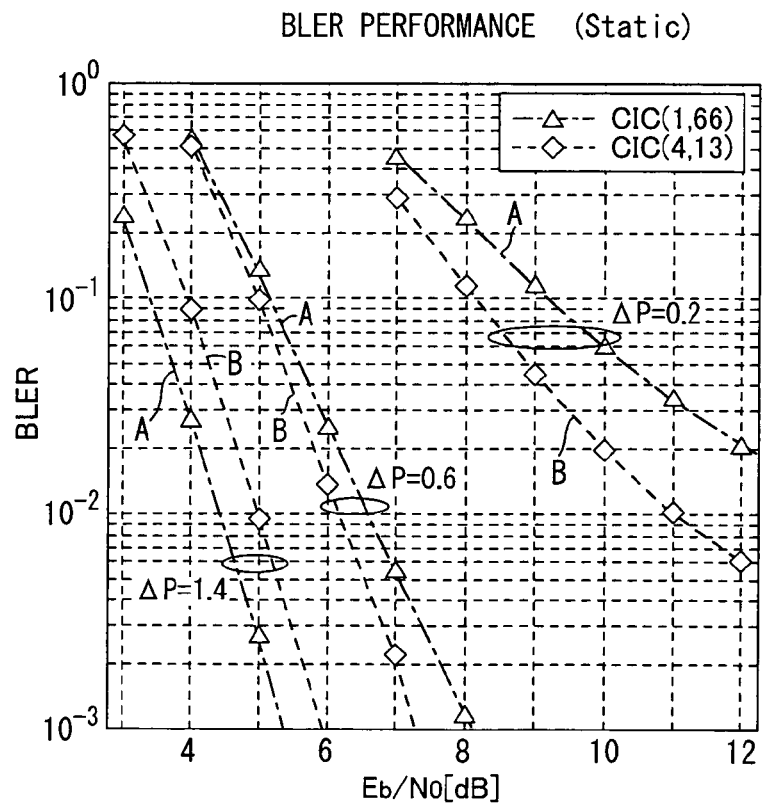
FIG. 5 is a BLER characteristic in a case where the turbo equalization iteration count $I_{EQU}$ and decoding iteration count $I_{DEC}$ are fixed (i.e., in case of CIC, or Constant Iteration Control)

FIG. 5 illustrates BLER characteristics in a case where turbo equalization iteration count $I_{EQU}$ and decoding iteration count $I_{DEC}$ were fixed (CIC: Constant Iteration Control) when amount of path attenuation ΔP was made 0.2, 0.6 and 1.4 in a static environment. That is, a characteristic A is a BLER (Block Error Rate) characteristic in a case where the combination was fixed at $(I_{EQU}, I_{DEC})$=(1,66), and a characteristic B is a BLER characteristic in a case where the combination was fixed at $(I_{EQU}, I_{DEC})$=(4,13). It should be evident from FIG. 5 that the combination of turbo equalization iteration count $I_{EQU}$ and decoding iteration count $I_{DEC}$ for which an excellent characteristic is obtained differs depending upon the amount of path attenuation.

Figure 6:
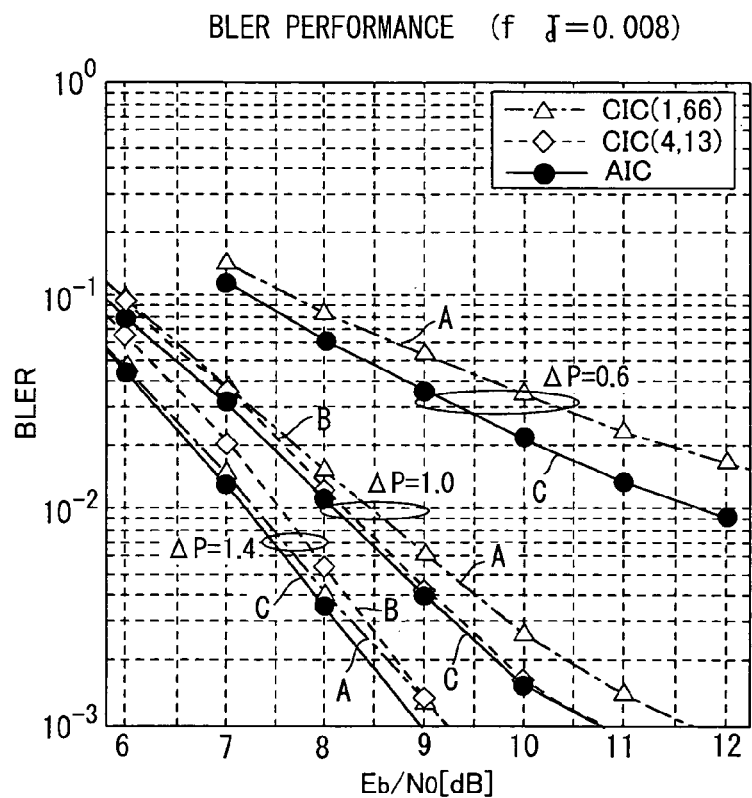
FIG. 6 is a BLER characteristic when AIC and CIC control is performed in a case where amount of path attenuation changes in a fading environment.

FIG. 6 illustrates BLER characteristics in a case where AIC and CIC control where carried out when amount of path attenuation ΔP was made 0.6, 1.0 and 1.44 in a fading environment. A characteristic A is a BLER characteristic in a case where the combination was fixed at $(I_{EQU}, I_{DEC})$=(1,66), a characteristic B is a BLER characteristic in a case where the combination was fixed at $(I_{EQU}, I_{DEC})$=(4,13), and a characteristic C is a BLER characteristic of a combination varied by AIC control (a BLER characteristic that prevails when the combination has been changed over depending upon the SIR value) according to the present invention. It should be noted that a normalized Doppler frequency ($f_dT$) is assumed to be 0.008 (v≈100 km/h). It will be understood from this simulation that an excellent BLER characteristic is obtained at all times irrespective of the state of the propagation path by exercising AIC control according to the present invention.

As confirmed by the simulation set forth above, the present invention is such that optimum iterative control that conforms to the propagation path is carried out in a case where there is a limitation upon processing time in an environment in which multipath delay that exceeds the guard interval exists. In comparison with a case where fixed iterative control is carried out, a better reception characteristic can be obtained.

According to this embodiment, the SIR value is estimated and the combinations ($I_{EQU}$, $I_{DEC}$) of turbo equalization iteration count $I_{EQU}$ and decoding iteration count $I_{DEC}$ are decided. However, it is possible to adopt an arrangement in which combinations of turbo equalization iteration count $I_{EQU}$ and decoding iteration count $I_{DEC}$ are decided upon estimating a value other than SIR, e.g., error rate or delay spread, etc., as the state of the propagation path.

Further, according to this embodiment, a case in which both ISI and ICI are eliminated has been described. However, the present invention can be applied to a case where at least ISI is eliminated.

Further, according to this embodiment, a diversity arrangement having two or more branches has been described. However, the present invention can be applied even in a receiving apparatus of a single branch.

(E) APPENDIX

Figure 7:
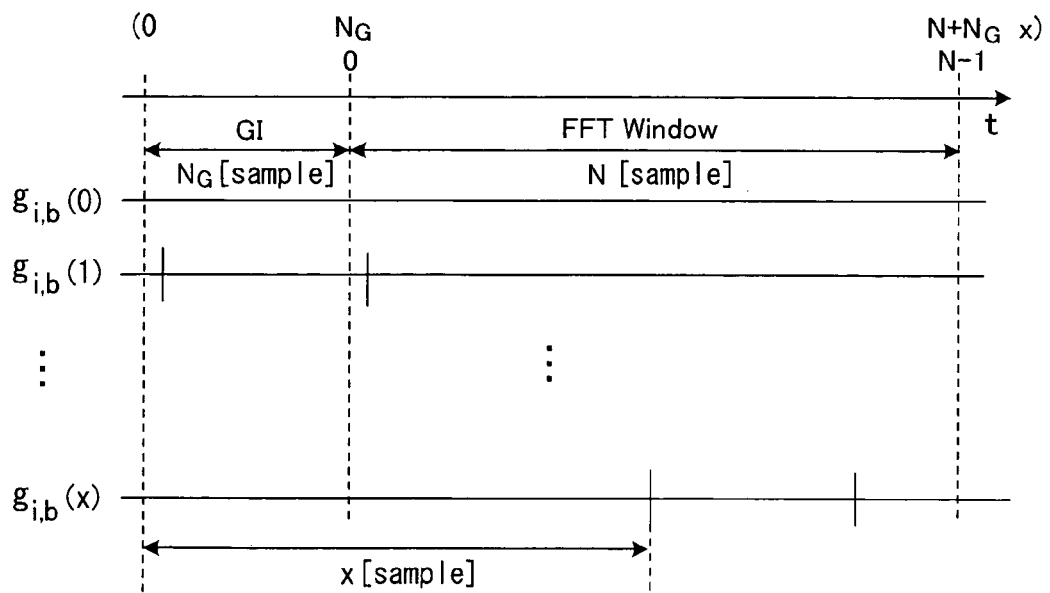
FIG. 7 is a diagram useful in describing a method of deriving an SIR calculation equation.
Figure 8:
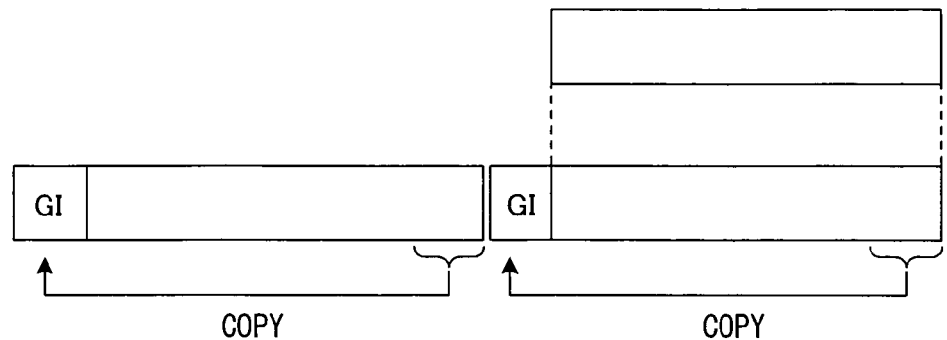
FIG. 8 is a diagram useful in describing insertion of a guard interval.
Figure 9:
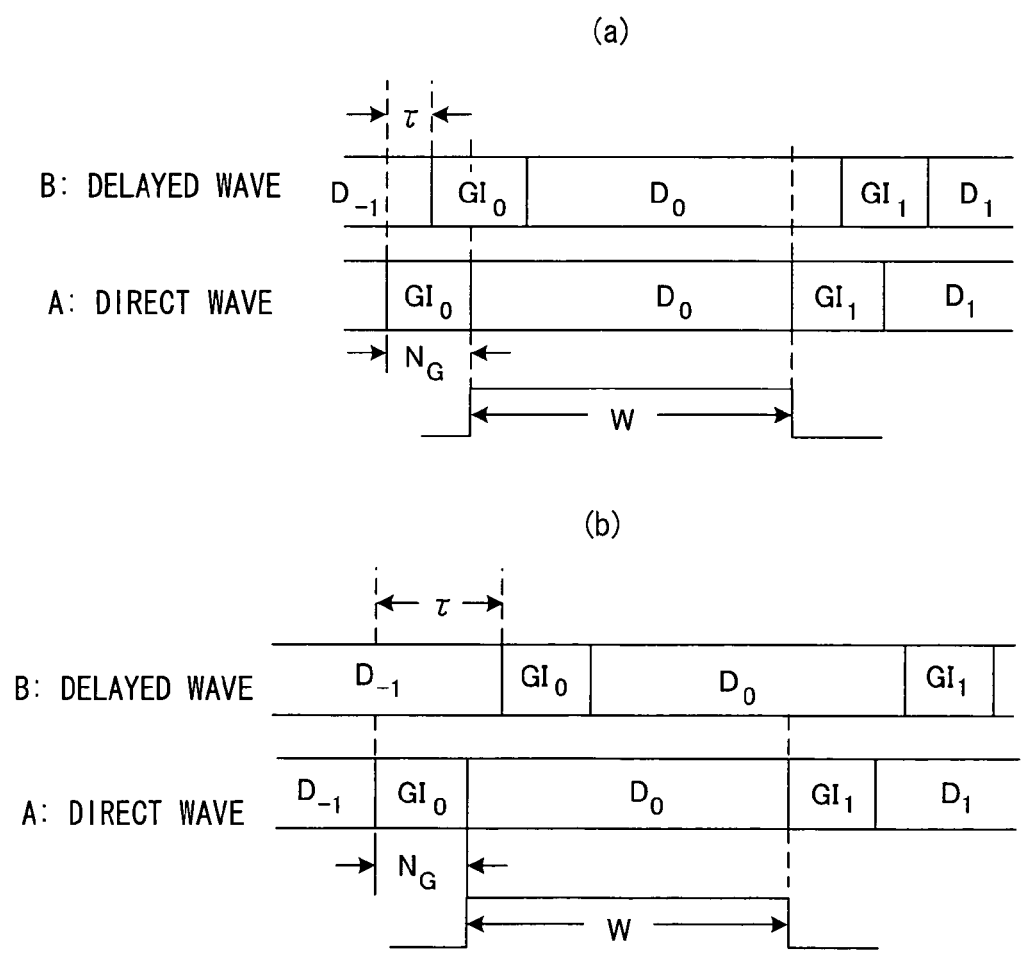
FIG. 9 is a diagram useful in describing inter-symbol interference due to a delayed wave.
Figure 10:
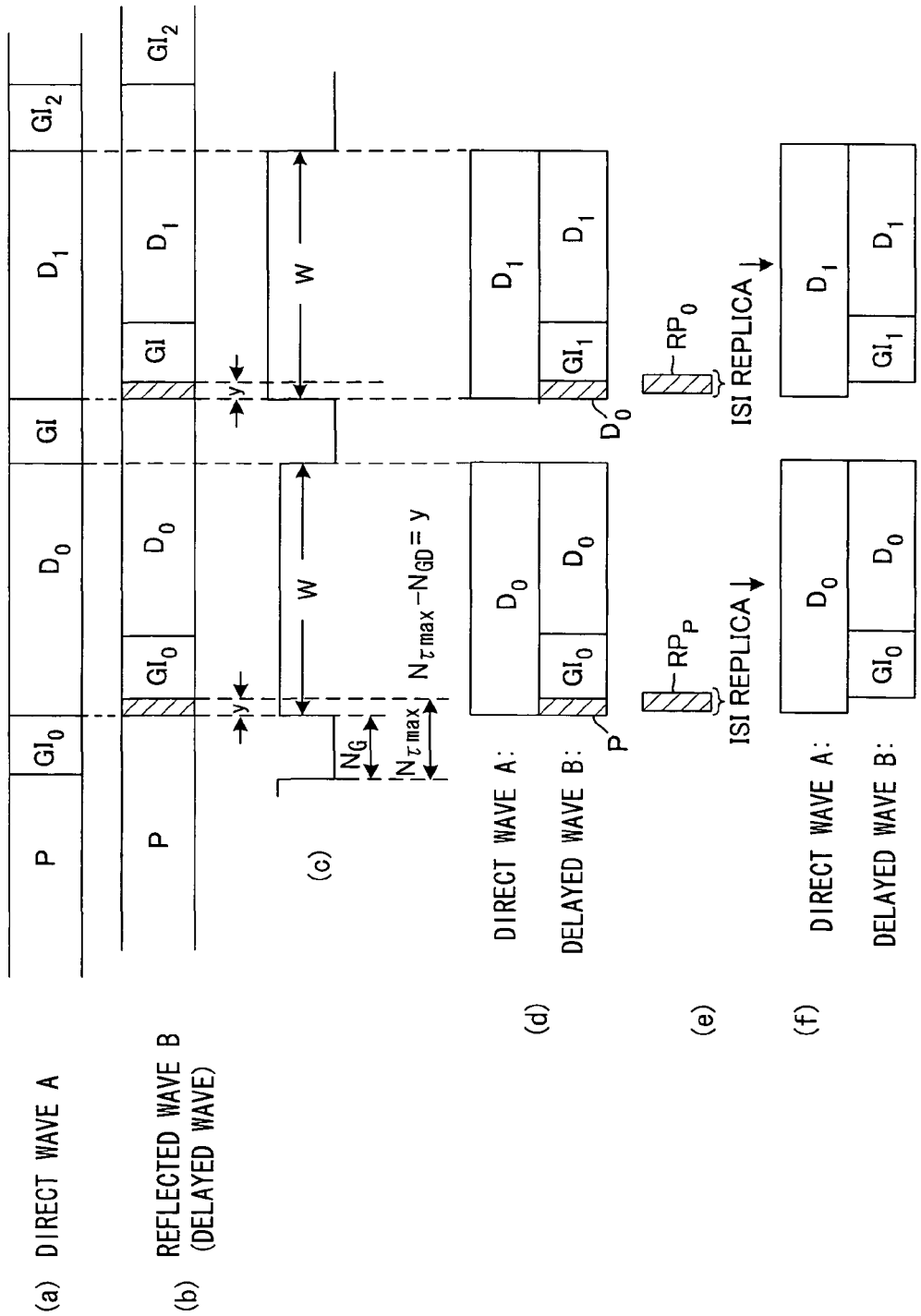
FIG. 10 is a diagram for describing ISI elimination.
Figure 11:
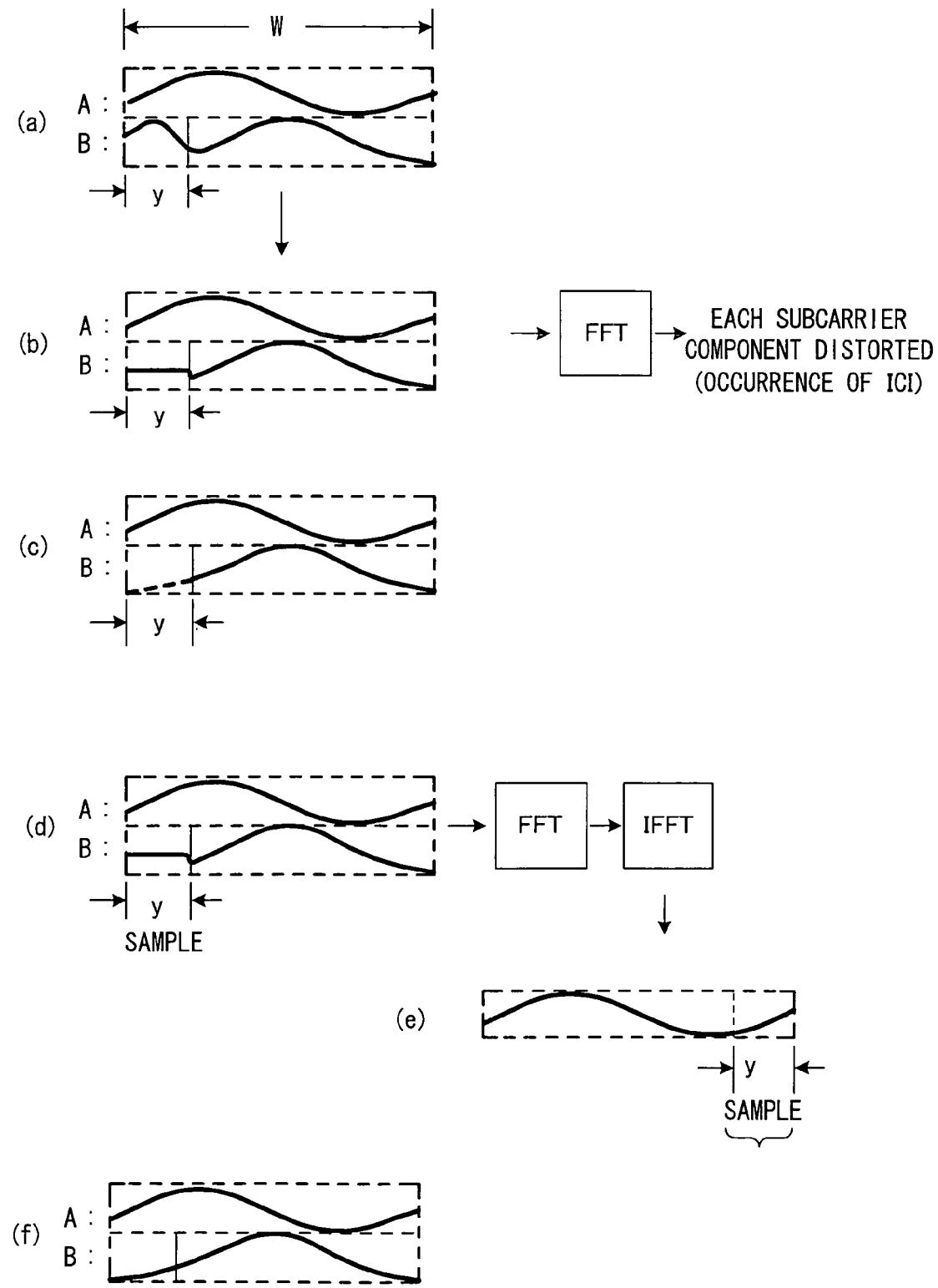
FIG. 11 is a diagram for describing ICI elimination.

FIG. 7 is a diagram useful in describing a method of deriving Equations (3) to (5).

Description of Variables i: symbol number; m, n: carrier number; t: sample number; N: FFT size; $N_G$: GI length (sample); b: receive branch number; z(i,n): symbol in nth carrier of ith OFDM symbol; x: sample number (path delay); $g_{i,b}(x)$: propagation-path response value of xth sample of bth branch Although "j" is used in Equations (1) to (5), here complex-number notation is employed and therefore "j" is changed to "x". Further, the x value has an offset $N_G$ to the t value in the FFT window. That is, there is a difference(=$N_G$) between x value and the t value.

In FIG. 7, the receive signal r(i,t) in the FFT window is represented by the following equation:

$$r(i, t) = \frac{1}{N} \sum_{x \in x < N_G} g_{i,b}(x) \sum_{n=0}^{N-1} z(i, n) * e^{j\frac{2\pi n(N-x+t)}{N}} + \frac{1}{N} \sum_{x \in x - N_G \leq t} g_{i,b}(x) \sum_{n=0}^{N-1} z(i, n) * e^{j\frac{2\pi n(N-x+t)}{N}} + \frac{1}{N} \sum_{x \in x - N_G > t} g_{i,b}(x) \sum_{n=0}^{N-1} z(i-1, n) * e^{j\frac{2\pi n(N+N_g-x+t)}{N}} + n(t) \quad (11)$$

A demodulated signal R(i,m) of an mth subcarrier of an ith OFDM symbol after OFDM demodulation is represented by the following equation:

$$R(i, m) = \sum_{t=0}^{N-1} r(i, t) * e^{-j\frac{2\pi mt}{N}} = \frac{1}{N} \sum_{x \in x \leq N_g} g_{i,b}(x) \sum_{t=0}^{N-1} \sum_{n=0}^{N-1} z(i, n) * e^{j\frac{2\pi n(N-x+t)}{N}} * e^{-j\frac{2\pi mt}{N}} + \frac{1}{N} \sum_{x \in x > N_G} g_{i,b}(x) \sum_{t=x-N_G}^{N-1} \sum_{n=0}^{N-1} z(i, n) * e^{j\frac{2\pi n(N-x+t)}{N}} * e^{-j\frac{2\pi mt}{N}} + \quad (12)$$

$$\frac{1}{N}\sum_{x\in x>N_G} g_{i,b}(x)$$

$$\sum_{t=0}^{x-N_G-1}\sum_{n=0}^{N-1} z(i-1,n)*e^{j\frac{2\pi n(N+N_G-x+t)}{N}}*e^{-j\frac{2\pi mt}{N}} +$$

$$\sum_{t=0}^{N-1} n(t)*e^{-j\frac{2\pi mt}{N}} = \sum_{x\in x\leq N_g} g_{i,b}(x)*z(i,m)*e^{j\frac{2\pi m(N-x)}{N}} +$$

$$\sum_{x\in x>N_G} g_{i,b}(x)*\frac{N-x+N_G}{N}*z(i,m)*e^{j\frac{2\pi m(N-x)}{N}} +$$

$$\sum_{\substack{n=0\\n\neq m}}^{N-1}\sum_{x\in x>N_G} g_{i,b}(x)*z(i,n)*e^{j\frac{2\pi n(N-x)}{N}}\frac{1}{N}\sum_{t=x-N_G}^{N-1} e^{j\frac{2\pi(n-m)t}{N}} +$$

$$\sum_{x\in x>N_G} g_{i,b}(x)*\frac{x-N_G}{N}z(i-1,m)*e^{j\frac{2\pi m(N-x+N_G)}{N}} +$$

$$\sum_{\substack{n=0\\n\neq m}}^{N-1}\sum_{x\in x>N_G} g_{i,b}(x)*z(i-1,n)*$$

$$e^{j\frac{2\pi n(N+N_G-x)}{N}}\frac{1}{N}\sum_{t=0}^{x-N_G-1} e^{j\frac{2\pi(n-m)t}{N}} + N(i,m)$$

In Equation (12), the first term is the desired signal component on a path in the guard interval, the second term is the desired signal component on a path that exceeds the guard interval, the third term is the inter-carrier interference component [$R_{isi}(i,m,i)$] from the mth subcarrier of the ith OFDM symbol on a path that exceeds the guard interval, the fourth term is the inter-symbol interference component [$R_{isi}(i,m,i-1)$] from the mth subcarrier of the (i−1)th OFDM symbol on a path that exceeds the guard interval, and the fifth term is an inter-carrier interference component [$R_{ici}(i,m,i-1)$] from the mth subcarrier of the (i−1)th OFDM symbol on a path that exceeds the guard interval.

(1) Desired Signal Power [$X_{i,b}(x)$ in Equation (4)]

As mentioned above, the first term of Equation (12) is signal power within the guard interval, and the second term is signal power that exceeds the guard interval. For these, therefore, we have respective ones of the following:

$$|g_{i,b}(x)|^2$$

and $$|g_{i,b}(x)|^2 \frac{(N-x+N_G)}{N}$$

The reason for this is as follows: If we let $1[|z(i,t)|^2=1]$ represent the signal power of each subcarrier and calculate overall power with regard to the transmit signal $s(i,t)$ ($0\leq t\leq N-1$) of one OFDM symbol, we have $$\sum_{t=0}^{N-1}|s(i,t)|^2 = \sum_{t=0}^{N-1}\left|\frac{1}{N}\sum_{n=0}^{N-1} z(i,n)*e^{j\frac{2\pi n(N-x+t)}{N}}\right|^2 \quad (13)$$

$$= \sum_{t=0}^{N-1}\sum_{n=0}^{N-1}\left|\frac{1}{N}z(i,n)*e^{j\frac{2\pi n(N-x+t)}{N}}\right|^2$$

$$= \sum_{t=0}^{N-1}\sum_{n=0}^{N-1}\frac{1}{N^2}$$

$$= 1$$

and the average power of one sample is $E[|s(i,t)|^2]=1/N$. Accordingly, with regard to Equation (4), we have the following:

$$X_{i,b}(x) = \begin{cases} 1 & x\leq N_G \\ \dfrac{N-x+N_G}{N} & x>N_G \end{cases} \quad (14)$$

This can be understood if note is taken of the fact that the suffix x represents the path number and the number of delay samples per se. Since the xth path ($x\leq N_G$) within the guard interval GI uses all of the signal power within the FFT window, the desired signal power. $X_{i,b(x)}$ is equal to 1 which is the overall power. On the other hand, the xth path ($x>N_G$) greater than the GI is ($x-N_G$) samples earlier in the window, and therefore the desired signal power is diminished correspondingly. If we let Ps(x) represent the desired signal power within the window at this time, Equation (4) will be obvious from $$P_s(x) = |g_{i,b}(x)|^2 \sum_{t=N-x+N_G}^{N-1} |s(i,t)|^2$$

$$= |g_{i,b}(x)|^2 \sum_{t=x-N_G}^{N-1} E(|s(i,t)|^2)$$

$$= |g_{i,b}(x)|^2 (N - x + N_G) * \frac{1}{N}$$

In the case of a path ($x\delta N_G$) within the guard interval, $(x-N_G) = 0$ holds and therefore we have $N*(1/N)=1$.

(2) Inter-Carrier Interference (ICI) Component (2a) The inter-carrier interference component $R_{ici}(i,m,i)$ from an adjacent subcarrier of the ith OFDM symbol is represented by the following equaton:

$$R_{ici}(i,m,i) = \sum_{\substack{n=0 \\ n\neq m}}^{N-1} \sum_{x\in x>N_G} g_{i,b}(x) * z(i,n) * e^{j\frac{2\pi n(N-x)}{N}} \qquad (15)$$

$$\frac{1}{N}\sum_{t=x-N_G}^{N-1} e^{j\frac{2\pi(n-m)t}{N}}$$

$$= \sum_{\substack{n=0 \\ n\neq m}}^{N-1} \sum_{x\in x>N_G} g_{i,b}(x) * z(i,n) * e^{j\frac{2\pi n(N-x)}{N}}$$

$$\frac{1}{N} * e^{j\frac{2\pi(n-m)(x-N_G)}{N}} \frac{1 - e^{j\frac{2\pi(n-m)(N-x+N_G)}{N}}}{1 - e^{j\frac{2\pi(n-m)}{N}}}$$

$$= \sum_{\substack{n=0 \\ n\neq m}}^{N-1} \sum_{x\in x>N_G} g_{i,b}(x) * z(i,n) * e^{j\frac{2\pi n(N-x)}{N}} *$$

$$-\left\{\frac{1}{N}\frac{1 - e^{j\frac{2\pi(n-m)(x-N_G)}{N}}}{1 - e^{j\frac{2\pi(n-m)}{N}}}\right\}$$

$$= \sum_{\substack{n=0 \\ n\neq m}}^{N-1} \sum_{x\in x>N_G} g_{i,b}(x) * z(i,n) * e^{j\frac{2\pi n(N-x)}{N}} *$$

$$-\left\{\frac{1}{N}\frac{\sin\left(\frac{\pi(n-m)(x-N_G)}{N}\right)}{\sin\left(\frac{\pi(n-m)}{N}\right)} e^{j\frac{\pi(n-m)(x-N_G-1)}{N}}\right\}$$

$$= \sum_{\substack{n=0 \\ n\neq m}}^{N-1} \sum_{x\in x>N_G} g_{i,b}(x)$$

$$\left\{\frac{\sin\left(\frac{\pi(n-m)(x-N_G)}{N}\right)}{\sin\left(\frac{\pi(n-m)}{N}\right)}\right.$$

$$\left. e^{j\frac{\pi[(n-m)(x-N_G-1)+2n(N-x)]}{N}}\right\} * \left\{-\frac{z(i,n)}{N}\right\}$$

(2b) Next, the inter-carrier interference component $R_{ici}(i,m,i-1)$ from the mth subcarrier of the (i−1)th OFDM symbol is represented by the following equation:

$$R_{ici}(i,m,i-1) = \sum_{\substack{n=0 \\ n\neq m}}^{N-1} \sum_{x\in x>N_G} g_{i,b}(x) * z(i-1,n) * \qquad (16)$$

$$e^{j\frac{2\pi n(N+N_G-x)}{N}} \frac{1}{N}\sum_{t=0}^{x-N_G-1} e^{j\frac{2\pi(n-m)t}{N}}$$

$$= \sum_{\substack{n=0 \\ n\neq m}}^{N-1} \sum_{x\in x>N_G} g_{i,b}(x) * z(i-1,n) * e^{j\frac{2\pi n(N_G-x)}{N}}$$

$$\frac{1}{N}\frac{1 - e^{j\frac{2\pi(n-m)(x-N_G)}{N}}}{1 - e^{j\frac{2\pi(n-m)}{N}}}$$

$$= \sum_{\substack{n=0 \\ n\neq m}}^{N-1} \sum_{x\in x>N_G} g_{i,b}(x) * z(i-1,n) * e^{j\frac{2\pi n(N_G-x)}{N}} *$$

$$-\left\{\frac{1}{N}\frac{1 - e^{j\frac{2\pi(n-m)(x-N_G)}{N}}}{1 - e^{j\frac{2\pi(n-m)}{N}}}\right\}$$

$$= \sum_{\substack{n=0 \\ n\neq m}}^{N-1} \sum_{x\in x>N_G} g_{i,b}(x) * z(i,n) * e^{j\frac{2\pi n(N_G-x)}{N}} *$$

$$-\left\{\frac{1}{N}\frac{\sin\left(\frac{\pi(n-m)(x-N_G)}{N}\right)}{\sin\left(\frac{\pi(n-m)}{N}\right)}\right.$$

$$\left. e^{j\frac{\pi(n-m)(x-N_G-1)}{N}}\right\}$$

$$= \sum_{\substack{n=0 \\ n\neq m}}^{N-1} \sum_{x\in x>N_G} g_{i,b}(x)$$

$$\left\{\frac{\sin\left(\frac{\pi(n-m)(x-N_G)}{N}\right)}{\sin\left(\frac{\pi(n-m)}{N}\right)}\right.$$

$$\left. e^{j\frac{\pi[(n-m)(x-N_G-1)+2n(N_G-x)]}{N}}\right\} * \left\{-\frac{z(i,n)}{N}\right\}$$

ICI average power [$P_{ici}(i,m,i)$, $P_{ici}(i,m,i-1)$] with respect to an mth subcarrier is indicated in Equations (17), (18) below.

$$P_{ici}(i,m,i) = |R_{ici}(i,m,i)|^2 \qquad (17)$$

$$= \sum_{\substack{n=0 \\ n\neq m}}^{N-1} \left|\sum_{x\in x>N_G} g_{i,b}(x) \left\{\frac{\sin\left(\frac{\pi(n-m)(x-N_G)}{N}\right)}{\sin\left(\frac{\pi(n-m)}{N}\right)}\right.\right.$$

$$\left.\left. e^{j\frac{\pi[(n-m)(x-N_G-1)+2n(N-x)]}{N}}\right\}\right|^2 E\left[\left|-\frac{z(i,n)}{N}\right|^2\right]$$

$$= \frac{1}{N^2}\sum_{\substack{n=0 \\ n\neq m}}^{N-1} \left|\sum_{x\in x>N_G} g_{i,b}(x) \left\{\frac{\sin\left(\frac{\pi(n-m)(x-N_G)}{N}\right)}{\sin\left(\frac{\pi(n-m)}{N}\right)}\right.\right.$$

$$\left.\left. e^{j\frac{\pi[(n-m)(x-N_G-1)+2n(N-x)]}{N}}\right\}\right|^2$$

-continued $$P_{ici}(i, m, i-1) = |R_{ici}(i, m, i-1)|^2 \quad (18)$$

$$= \sum_{\substack{n=0\\n\neq m}}^{N-1} \left| \sum_{x\in x>N_G} g_{i,b}(x) \left\{ \frac{\sin\left(\frac{\pi(n-m)(x-N_G)}{N}\right)}{\sin\left(\frac{\pi(n-m)}{N}\right)} \right. \right.$$

$$\left. \left. e^{j\frac{\pi\{(n-m)(x-N_G-1)+2n(N_G-x)\}}{N}} \right\} \right|^2 E\left[ \left| -\frac{z(i-1,n)}{N} \right|^2 \right]$$

$$= \frac{1}{N^2} \sum_{\substack{n=0\\n\neq m}}^{N-1} \left| \sum_{x\in x>N_G} g_{i,b}(x) \left\{ \frac{\sin\left(\frac{\pi(n-m)(x-N_G)}{N}\right)}{\sin\left(\frac{\pi(n-m)}{N}\right)} \right. \right.$$

$$\left. \left. e^{j\frac{\pi\{(n-m)(x-N_G-1)+2n(N_G-x)\}}{N}} \right\} \right|^2$$

Accordingly, average power $\overline{P}_{ici}(i,i)$, $\overline{P}_{ici}(i,i-1)$ of ICI is represented by Equation (20) below by using Equation (19) below.

$$\sum_{\substack{n=0\\n\neq m}}^{N-1} \left| \frac{\sin\left(\frac{\pi(n-m)(x-N_G)}{N}\right)}{\sin\left(\frac{\pi(n-m)}{N}\right)} \right|^2 = (x-N_G)(N-x+N_G) \quad (19)$$

$$\overline{P}_{ici}(i, i) = \overline{P}_{ici}(i, i-1) \equiv |g_{i,b}(x)|^2 \frac{(x-N_G)(N-x+N_G)}{N^2} \quad (20)$$

Thus, average power of ICI in the ith symbol becomes $$2|g_{i,b}(x)|^2 \frac{(x-N_G)(N-x+N_G)}{N^2}$$

(3) Inter-Symbol Interference (ISI) Component

It is obvious from the third term of Equation (12) that the following holds:

$$\overline{P}_{ici}(i, i) = |g_{i,b}(x)|^2 \frac{(x-N_G)^2}{N^2}$$

Accordingly, Equation (5) becomes as follows from (ISI)+(ICI):

$$Y_{i,b}(x) = \frac{(x-N_G)^2}{N^2} + 2\frac{(x-N_G)(N-x+N_G)}{N^2}$$

Further, based upon the above-mentioned desired signal power, inter-carrier interference (ICI) component and inter-symbol interference (ISI) component, it is self-evident that Equation (3) expresses desired power vs. interference power of (desired signal power)/[inter-carrier interference (ICI) component+inter-symbol interference (ISI) component].

As many apparently widely different embodiments of the present invention can be made without departing from the spirit and scope thereof, it is to be understood that the invention is not limited to the specific embodiments thereof except as defined in the appended claims.

What is claimed is:

1. An OFDM receiving method for receiving a signal that has sustained inter-symbol interference owing to a delayed wave that exceeds a guard interval, comprising:
    estimating a signal-to-interference ratio (SIR) as a state of a propagation path;
    performing equalization processing including eliminating processing for eliminating at least inter-symbol interference from the receive signal and demodulation and decoding processing the receive signal on which the eliminating processing is performed; and
    changing over a combination of number of first iterations of equalization processing and number of second iterations for repeating the decoding in each decoding processing of the equalization processing, based upon the SIR so that the number of first iterations is increased and the number of second iterations is decreased when a value of the SIR decreases.

2. The method according to claim 1, further comprising:
    estimating a ratio SIR of desired signal power to interference power as said state of the propagation path, using an impulse response group of respective propagation paths with respect to an OFDM symbol group.

3. The method according to claim 2, further comprising:
    setting beforehand a corresponding relationship between combinations of numbers of iterations of the equalization processing and numbers of iterations of the decoding and SIRs; and
    deciding number of iterations of the equalization processing and number of iterations of the decoding using this corresponding relationship.

4. The method according to claim 3, further comprising:
    upon taking into consideration the time required for processing in the equalization processing other than decoding processing and the time required to perform the decoding one time, obtaining a combination of number of iterations of the equalization processing and number of iterations of the decoding in such a manner that the equalization processing of the number of iterations will be completed within a set processing time; and
    setting the corresponding relationship between said combination and SIR so as to optimize the reception characteristic.

5. An OFDM receiving apparatus for receiving a signal that has sustained inter-symbol interference owing to a delayed wave that exceeds a guard interval, eliminating at least inter-symbol interference from the receive signal and applying demodulation and decoding processing to the receive signal from which interference has been eliminated, comprising:
    an estimation unit for estimating a signal-to-interference ratio (SIR) as a state of a propagation path;
    an interference eliminating unit that performs eliminating processing for eliminating at least inter-symbol interference from a receive signal;
    a demodulation processing unit that applies demodulation processing to the receive signal on which the elimination processing is performed;
    a decoding processing unit that applies error-correcting decoding processing to the demodulated signal; and
    an iteration controller for deciding, based upon the SIR, a combination of number of first iterations of equalization processing consisted of the eliminating processing, demodulation processing and error-correcting decoding processing and number of second iterations for repeating the decoding in each error-correcting decoding processing of the equalization processing so that the number of first iterations is increased and the number of second iterations is decreased when a value of the SIR decreases.

6. The apparatus according to claim 5, wherein said estimation unit is a SIR estimation unit that estimates a ratio SIR of desired signal power to interference power as said state of the propagation path, using an impulse response group of respective propagation paths with respect to an OFDM symbol group.

7. The apparatus according to claim 6, wherein said iteration controller has a corresponding relationship between combinations of numbers of iterations of equalization processing and numbers of iterations of decoding and SIRs and decides number of iterations of the equalization processing and number of iterations of decoding using this corresponding relationship.

8. The apparatus according to claim 7, wherein each combination in the corresponding relationship is decided in such a manner that the equalization processing will be completed within a set processing time.

* * * * *